US012799436B2

(12) United States Patent
Noble et al.

(10) Patent No.: US 12,799,436 B2
(45) Date of Patent: Nov. 17, 2026

(54) COMPOSITION COMPRISING A GLYCOL ETHER/HYDROCARBON SOLVENT MIXTURE FOR REMOVING AN UNWANTED MATERIAL FROM AN OBJECT

(71) Applicant: PostProcess Technologies, Inc., Buffalo, NY (US)

(72) Inventors: Matthew J. Noble, Buffalo, NY (US); Daniel Hutchinson, Buffalo, NY (US)

(73) Assignee: PostProcess Technologies, Inc., Buffalo, NY (US)

( * ) Notice: Subject to any disclaimer, the term of this patent is extended or adjusted under 35 U.S.C. 154(b) by 315 days.

(21) Appl. No.: 17/913,359

(22) PCT Filed: Mar. 25, 2021

(86) PCT No.: PCT/US2021/024062
§ 371 (c)(1),
(2) Date: Sep. 21, 2022

(87) PCT Pub. No.: WO2021/195320
PCT Pub. Date: Sep. 30, 2021

(65) Prior Publication Data

US 2023/0123705 A1 Apr. 20, 2023

Related U.S. Application Data

(60) Provisional application No. 63/000,670, filed on Mar. 27, 2020.

(51) Int. Cl.

| | |
|---|---|
| ***C11D 7/50*** | (2006.01) |
| ***B08B 3/08*** | (2006.01) |
| ***B08B 3/10*** | (2006.01) |
| ***B29C 64/124*** | (2017.01) |
| ***B29C 64/35*** | (2017.01) |
| ***B33Y 10/00*** | (2015.01) |
| ***B33Y 40/20*** | (2020.01) |
| ***C11D 7/24*** | (2006.01) |
| ***C11D 7/26*** | (2006.01) |

(52) U.S. Cl.
CPC .............. *C11D 7/5022* (2013.01); *B08B 3/08* (2013.01); *B08B 3/10* (2013.01); *B29C 64/124* (2017.08); *B29C 64/35* (2017.08); *B33Y 10/00* (2014.12); *B33Y 40/20* (2020.01); *C11D 7/244* (2013.01); *C11D 7/261* (2013.01); *C11D 7/263* (2013.01); *B08B 2203/007* (2013.01); *B08B 2220/04* (2013.01); *C11D 2111/18* (2024.01)

(58) Field of Classification Search
CPC ......... C11D 3/184; C11D 7/244; C11D 7/261; C11D 7/263; C11D 7/5022; C11D 7/509
See application file for complete search history.

(56) References Cited

U.S. PATENT DOCUMENTS

| | | | | |
|---|---|---|---|---|
| 4,561,991 A * | 12/1985 | Herbots | C11D 7/261 | 510/306 |
| 5,597,792 A * | 1/1997 | Klier | C11D 17/0021 | 510/432 |
| 5,817,585 A * | 10/1998 | Rose | C11D 17/049 | 428/305.5 |
| 6,395,103 B1 * | 5/2002 | Machac, Jr. | C11D 7/5009 | 134/40 |
| 2003/0191037 A1 * | 10/2003 | Rindo | C11D 3/2034 | 510/505 |
| 2005/0137104 A1 * | 6/2005 | Maxwell | C11D 3/3749 | 510/218 |
| 2006/0234890 A1 * | 10/2006 | Griese | C09D 9/005 | 510/214 |
| 2010/0273696 A1 * | 10/2010 | Hopfstock | C09D 9/04 | 510/413 |
| 2012/0264673 A1 * | 10/2012 | Keller | C11D 3/43 | 510/432 |
| 2015/0239007 A1 | 8/2015 | Selwyn | | |
| 2018/0155570 A1 | 6/2018 | Ledford et al. | | |
| 2018/0178447 A1 * | 6/2018 | Abbott, Jr | B22F 10/28 | |
| 2020/0324470 A1 * | 10/2020 | Walker | B29C 71/02 | |
| 2021/0269658 A1 * | 9/2021 | Hutchinson | C09D 9/00 | |
| 2022/0023007 A1 * | 1/2022 | Chakraborty | B33Y 10/00 | |

(Continued)

FOREIGN PATENT DOCUMENTS

| | | |
|---|---|---|
| KR | 20080098030 A | 11/2008 |
| WO | 2018/222395 * | 12/2018 |
| WO | 2018222395 A1 | 12/2018 |

(Continued)

OTHER PUBLICATIONS

International Search Report and Written Opinion of the International Searching Authority from International Patent Application No. PCT/US2021/024062, dated Jun. 4, 2021, 9 pages.
Extended European Search Report from European Patent Application No. 21777031, dated Mar. 18, 2024, 13 pages.
International Preliminary Report on Patentability from International Patent Application No. PCT/US2021/024062, dated Oct. 6, 2022, 9 pages.
Office Action from Japanese Patent Application No. 2022-558037, dated Jan. 6, 2025, 3 pages.
Office Action from Korean Patent Application No. 2022-7036160, mailed on Feb. 24, 2026, with translation, pp. 1-11.

*Primary Examiner* — Charles I Boyer
(74) *Attorney, Agent, or Firm* — Lempia Sumerfield Katz LLC

(57) ABSTRACT

Compositions or finishing solutions configured to remove unwanted material, such as uncured material or resin, from additively manufactured objects are disclosed herein, in one example, the finishing solution includes a first glycol ether and a second glycol ether and/or a high flash point hydrocarbon, wherein the finishing solution has a flash point of at least 93.3° C. In alternative examples, the finishing solution may also include a third glycol ether, a high flash point alcohol, and/or an acetate of a glycol ether.

15 Claims, 5 Drawing Sheets

(56) References Cited

U.S. PATENT DOCUMENTS

2022/0395961 A1* 12/2022 Wu ........................ B24D 18/00

FOREIGN PATENT DOCUMENTS

WO 2019203852 A1 10/2019
WO 2020/056316 * 3/2020
WO WO-2020056316 A1 * 3/2020

* cited by examiner

COMPOSITION COMPRISING A GLYCOL ETHER/HYDROCARBON SOLVENT MIXTURE FOR REMOVING AN UNWANTED MATERIAL FROM AN OBJECT

This application is a § 371 nationalization of PCT Application Serial No. PCT/US2021/024062, filed Mar. 25, 2021, designating the United States, which is hereby incorporated by reference in its entirety. This application also claims the benefit of U.S. Provisional Patent Application No. 63/000,670, filed Mar. 27, 2020, which is hereby incorporated by reference in its entirety.

FIELD

The following disclosure relates to compositions for removing unwanted material from a surface of an object. In particular, the disclosure relates to compositions for removing unwanted material, such as uncured material and/or resins from a surface of an object made by additive manufacturing techniques such as three-dimensional (3D) printing. The disclosure also relates to methods of using such compositions or solutions in removing unwanted material, such as uncured material or resins from a surface of an object.

BACKGROUND

Additive manufacturing processes, such as 3D printing (e.g., Selective Laser Sintering (SLS), Stereolithography (SLA), fused deposition modeling (FDM), material jetting (MJ), electron beam (e-beam), etc.) provide significant advantages for many applications. Additive manufacturing processes enable the production of parts having complex geometries that would be difficult to make using traditional manufacturing techniques. Also, additive manufacturing processes enable the efficient production of low volumes of parts. However, some additive manufacturing processes produce parts that require removal of unwanted material, such as uncured material or resin. The unwanted material is produced during the printing portion of the additive manufacturing process and may be needed to support portions of the part as the part is being printed. After the printing portion of the process is completed, the unwanted material must be removed before the part can be used for its intended purpose.

The unwanted material itself may have a complex geometry and may also be extensive, because it may support the object at a plurality of locations. Additionally, because additive manufacturing prints an object in discrete layers, the surface finish of an object may be rough because edges of the layers may not align precisely with each other, thus creating a rough, bumpy outer surface. This outer surface may be unappealing visually or may have stress concentrations or irregularities, which need to be removed before testing or use.

Some finishing solutions for additive manufactured parts are organic based and have a low flash point. In one example, the finishing solution is isopropanol (IPA). These solutions may require precautions to work with. There has been a long felt need for a chemical finishing solution that overcomes such limitations.

SUMMARY

The disclosure provides compositions or finishing solutions and methods for removing unwanted material (e.g., uncured material and/or resins), such as from a surface of an object made by additive manufacturing techniques. The disclosure further provides products formed from use of the finishing solution, wherein unwanted material has been removed from the surface of the object to provide a cleaned object.

In one embodiment, a finishing solution includes a first glycol ether and a second glycol ether and/or a high flash point hydrocarbon, wherein the finishing solution has a flash point of at least 93.3° C. (200° F.). In alternative examples, the finishing solution may also include a third glycol ether, a high flash point alcohol, and/or an acetate of a glycol ether.

In another embodiment, a method of removing unwanted material from a surface of an object (e.g., a 3D printed object) is provided. The method includes providing a finishing solution having a first glycol ether and a second glycol ether and/or a high flash point hydrocarbon, wherein the finishing solution has a flash point of at least 93.3° C. (200° F.); submerging the object in the finishing solution; agitating the object while the object is submerged in the finishing solution; and removing the object from the finishing solution, wherein unwanted material has been removed from the surface of the object and remains within the finishing solution.

In a further embodiment, a partially-cured and cleaned object with unwanted resin removed from a surface of the partially-cured and cleaned object is provided, wherein the partially-cured and cleaned object is formed by a process of: providing a finishing solution having a first glycol ether and a second glycol ether and/or a high flash point hydrocarbon, wherein the finishing solution has a flash point of at least 93.3° C. (200° F.); submerging, in a finishing solution, a partially-cured object having the unwanted material on the surface of the partially-cured object; agitating the partially-cured object while the partially-cured object is submerged in the finishing solution; and removing the partially-cured object from the finishing solution, wherein the unwanted material has been removed from the surface of the partially-cured object and remains within the finishing solution, therein forming the partially-cured and cleaned object.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Exemplary embodiments are described herein with reference to the following drawings.

FIG. 3A shows the object prior to application of a finishing solution. FIG. 3B shows the cleaned object after submersion in a finishing solution.

Figure 1:
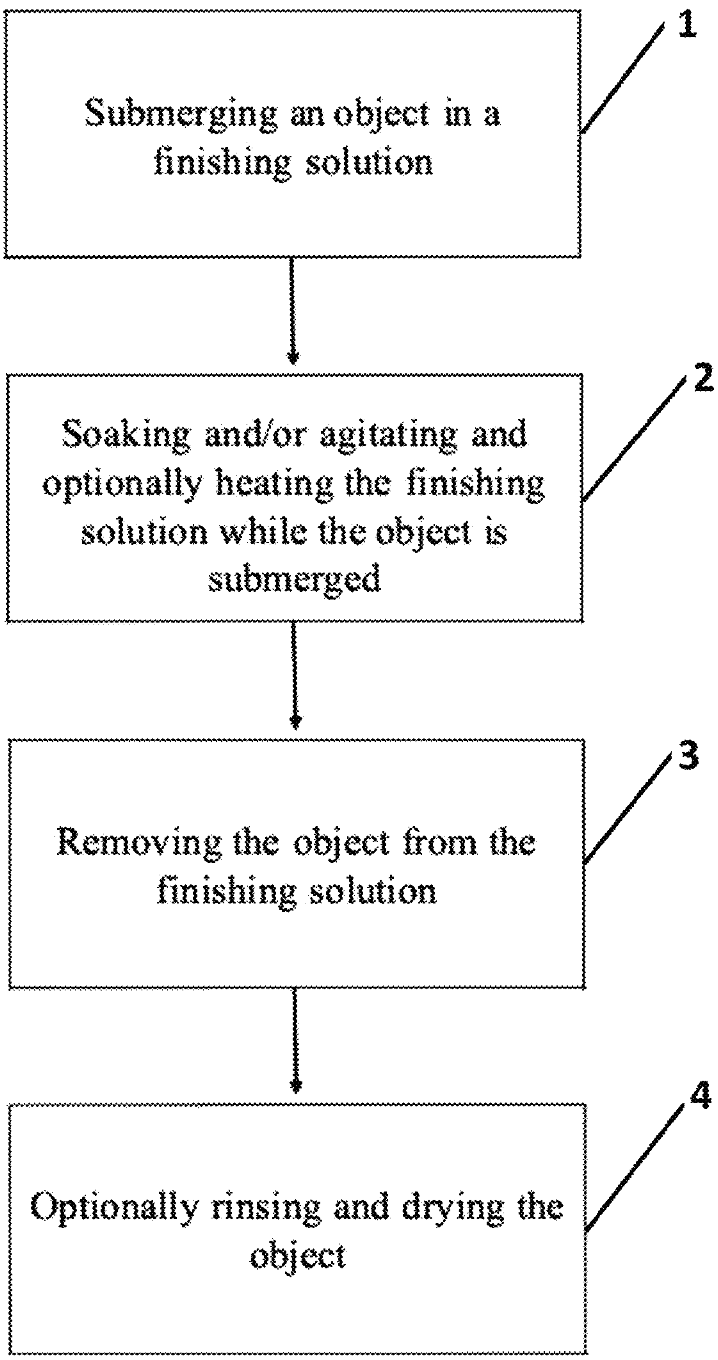
FIG. 1 depicts a flow diagram of an exemplary method of using a finishing solution.

While the disclosed compositions and methods are representative of embodiments in various forms, specific embodiments are illustrated in the drawings (and are hereafter described), with the understanding that the disclosure is intended to be illustrative and is not intended to limit the claim scope to the specific embodiments described and illustrated herein.

DETAILED DESCRIPTION

As noted above, there are considerations to be addressed when working with certain prior commercially available finishing solutions such as isopropanol (IPA) to remove materials from additively manufactured polymers, resins, plastic materials, and parts. For example, some prior commercial finishing solutions have a low flash point, requiring safety precautions. Additionally, or alternatively, certain prior commercial finishing solutions may have a high vapor pressure, may be expensive, may require a large volume of material to remove a fixed amount of unwanted material, may be slow in removing such material, or a combination thereof. As such, there has been a long felt need for a chemical finishing solution that overcomes such limitations.

Improved compositions or finishing solutions and their methods of making and use are disclosed herein.

Although the disclosure will be described in terms of certain embodiments, other embodiments, including embodiments that do not provide all of the benefits and features set forth herein, are also within the scope of this disclosure. Various structural, logical, and process step changes may be made without departing from the scope of the disclosure.

The disclosure may be embodied as one or more finishing compositions or solutions configured to remove unwanted material from additively manufactured polymers, resins, plastic materials, or parts, (e.g., resin from a 3D printed stereolithography (SLA) object and/or weakening material that was associated with the removed resin). In certain examples, such as with SLA, the resin undergoes a curing process with the laser during the print process. In such a 3D printing process, some uncured or unwanted material may remain on the surface of printed object. The amount of uncured or unwanted material on the surface of the additively manufactured, e.g., 3D printed, object may vary based on the type of printing process used or the type or structure of object being formed. In certain examples, the uncured or unwanted resin may be removed from the surface of the object using a finishing solution formulated according to an embodiment of the present disclosure to provide a cleaned and, in some examples, at least partially-cured, object. Following removal of unwanted material (e.g., uncured resin) from the surface of the object, a post-cure process of the object may be performed using a UV oven. In other words, the unwanted material may be dissolved by a finishing solution of an embodiment before the object is placed into an ultraviolet ("UV") curing chamber for final curing. This removal of unwanted or uncured material prior to a final curing is advantageous, as such removal allows for the printed object to cure normally (e.g., in an expected or set amount of time).

Definitions

As used herein, the term "object" may refer to a 3D-printed object (e.g., a 3D printed SLA object) that is not in its desired final form.

As used herein, the term "finishing" may refer to removing unwanted material from the surface of an additively manufactured object (e.g., a 3D-printed object) so as to produce a finished or semi-finished part. Finishing may include one or more processes, including, but not limited to, removing uncured material, removing unwanted resin, removing unwanted metal powder, removing unwanted print material, and/or removing unwanted support material. In the 3D printing industry, finishing may also be referred to as "cleaning."

As used herein, the term "unwanted material" may include uncured material or unwanted resin (e.g., on a surface of a 3D printed object). Unwanted material may be the same material as the object being manufactured or may be a different material. Materials that may be removed during finishing include, but are not limited to, Accura 25, Accura 48HTR, Accura 55, Accura 60, Accura ABS, Accura Bluestone, Accura ClearVue, Accura Extreme, Accura SL 5530, e-Stone, Figure 4 ELAST-BLK, Figure 4 ELAST-BLK 10, Figure 4 TOUGH-BLK 20, Figure 4 TOUGH-GRY 10, VisiJet Clear, VisiJet Flex, FORMLABS® (e.g., Clear, White, Tough, Castable, Flexible, Dental SG, and the like) photopolymer resin, Carbon (CE, DPR 10, EPU 40, EPU 41, EPX, RPU 70, UMA 90, PR 25), Somos 9120, Somos Element, Somos EvoLVe, Somos PerForm, Somos ProtoGen 18420, Somos ProtoTerm, Somos Taurus, Somos Watershed, WaterClear Ultra, Somos NeXt, and the like.

As used herein, the term "agitated" may refer to effecting movement by an outside force. With regard to the finishing solution, non-limiting examples of agitation include moving finishing solution via a pump, stirring, using longitudinal waves at an ultrasonic frequency, or combinations thereof.

Compositions or Finishing Solutions

Improved compositions or finishing solutions for post processing removal of unwanted or uncured material may include a first glycol ether. In certain examples, the first glycol ether may be combined in solution with a second glycol ether and a third glycol ether, wherein the first, second, and third glycol ether compounds are different from one another. In some examples, the finishing solution may further include a high flash point ester. As used herein, a high flash point ester may refer to an ester compound having a flash point of at least 93.3° C. (200° F.).

In certain examples, the first glycol ether may be combined in solution with a second, different glycol ether and a high flash point ester. In certain examples, such a finishing solution may include: (a) 20-60% by weight of the first glycol ether, (b) 20-60% by weight of the second glycol ether; and (c) 1-20% by weight of a high flash point ester, such that the total weight percent of the first glycol ether, the second glycol ether, and the high flash point ester add up to 100% (i.e., wherein the total weight percent of these components ignores any additional compounds or impurities present in the finishing solution).

In certain examples, such a finishing solution may include: (a) 20-60% by weight of the first glycol ether, (b) 20-60% by weight of the second glycol ether; (c) 20-60% by weight of the third glycol ether, and (d) 0-20% by weight of a high flash point ester, such that the total weight of the first glycol ether, the second glycol ether, the third glycol ether, and the (optional) high flash point ester add up to 100% (i.e., wherein the total weight percent of these components ignores any additional compounds or impurities present in the finishing solution).

In other examples, the first glycol ether may be combined in solution with a second, different glycol ether, a high flash point hydrocarbon or alcohol, and (optionally) a high flash point ester. As used herein, high flash point hydrocarbons or alcohols may refer to hydrocarbons or alcohols having a flash point of at least 93.3° C. (200° F.). In certain examples, such a finishing solution may include: (a) 20-60% by weight of the first glycol ether, (b) 20-60% by weight of the high flash point hydrocarbon or alcohol; and (c) 20-60% by weight of a high flash point ester, such that the total weight of the first glycol ether, the high flash point hydrocarbon or alcohol, and the high flash point ester add up to 100% (i.e., wherein the total weight percent of these components ignores any additional compounds or impurities present in the finishing solution).

In yet additional alternative examples, the first glycol ether may be combined in solution with a high flash point hydrocarbon and a high flash point alcohol or acetate of a glycol ester. As used herein, a high flash point acetate of a glycol ester may refer to an acetate of glycol ester having a flash point of at least 93.3° C. (200° F.). In certain examples, such a finishing solution may include: (a) 20-60% by weight of the first glycol ether, (b) 20-60% by weight of the high flash point hydrocarbon; and (c) 20-60% by weight of a high flash point alcohol or acetate of a glycol ester, such that the total weight of the first glycol ether, the high flash point hydrocarbon, and the high flash point alcohol or acetate of a glycol ester add up to 100% (i.e., wherein the total weight percent of these components ignores any additional compounds or impurities present in the finishing solution).

Examples of glycol ethers (i.e., for the first glycol ether and potential second and third glycol ethers) include, but are not limited to the following glycol ethers and acetates of glycol ethers: 2-Butoxy Ethanol (EB), Dipropyl Glycol Monomethyl Ether (DPM), Dipropylene Glycol Methyl Ether Acetate (DPMA), Ethylene Glycol Monohexyl Ether (aka 2-(Hexyloxy)ethanol) (aka 2-HEXOXYETHANOL) (HEX), Methyl Carbitol) (2-(2-Methoxyethoxy)Ethanol) (MC), Dipropylene Glycol n-Propyl Ether (DPnP), Ethyl Carbitol (2-(2-Ethoxyethoxy)Ethanol) (EC), Butyl Carbitol (2-(2-Butoxyethoxy)Ethanol) (BC), Propyl Carbitol (2-(2-Propoxyethoxy)Ethanol)) (PC), Dipropylene Glycol Butyl Ether (DPnB), Triethylene Glycol Dimethyl Ether (aka 1,2-Bis(2-methoxyethoxy) Ethane), 2-(2-Ethoxyethoxy) Ethyl Acetate (ECA), 2-(2-Butoxyethoxy) Ethyl Acetate (BCA), Dibutyl Carbitol (Diethylene Glycol Dibutyl Ether) (DC), Triethylene Glycol Monomethyl Ether (TM), Tripropylene Glycol Methyl Ether (TPM), Tripropylene Glycol n-Butyl Ether (TPnB), Triethylene Glycol Monoethyl Ether (TEGM), DPG (Dipropylene Glycol), Tetraethylene Glycol Dimethyl Ether (TTGD), and/or Triethylene Glycol Monobutyl Ether (aka BUTOXYTRIGLYCOL).

In certain examples, the high flash point hydrocarbon or alcohol may include a high linear alpha or internal olefin such as 1-Dodecene, 1-Tetradecene, 1-Hexadecene, 1-Octadecene, or higher olefin blends in a range of C20-C24, C24-C30, or C20-C30. Additionally, or alternatively, the high flash point hydrocarbon or alcohol compound may include Hexadecane, 2-Phenoxyethanol, and/or Benzyl Alcohol.

In certain examples, high flash point esters may include Ethyl Benzoate (EBZ), Propyl Benzoate (PBZ), Dimethyl Adipate (DMA), Dimethyl Propanedioate, Dimethyl Succinate, Dimethyl Glutarate, and/or Butyl Benzoate. In certain examples, the high flash point ester is a high flash point methyl ester.

In certain examples, a high flash point acetate of a glycol ester may include acetates such as Dipropylene Glycol Methyl Ether Acetate, Ethylene Glycol Monohexyl Ether, 2-(2-Ethoxyethoxy) Ethyl Acetate (Ethoxy Carbitol Acetate), and/or 2-(2-Butoxyethoxy) Ethyl Acetate (Butyl Carbitol Acetate).

Properties of Compositions/Finishing Solutions

In certain examples, the finishing solutions described herein have a flash point of at least 93.3° C. (200° F.), at least 98.9° C. (210° F.), or at least 104.4° C. (220° F.), and, in some embodiments, less than or equal to 200° C. (392° F.), 150° C. (302° F.), or 120° C. (248° F.). In certain examples, the finishing solution has a flash point in a range of 93.3° C. (200° F.) to 200° C. (392° F.), in a range of 93.3° C. (200° F.) to 150° C. (302° F.), in a range of 93.3° C. (200° F.) to 120° C. (248° F.), in a range of 98.9° C. (210° F.) to 200° C. (392° F.), in a range of 98.9° C. (210° F.) to 150° C. (302° F.), in a range of 98.9° C. (210° F.) to 120° C. (248° F.), in a range of 104.4° C. (220° F.) to 200° C. (392° F.), in a range of 104.4° C. (220° F.) to 150° C. (302° F.), or in a range of 104.4° C. (220° F.) to 120° C. (248° F.). This may be advantageous, in comparison to commercial compositions such as isopropanol alcohol (IPA), in allowing for a reduced amount of equipment or safety protocols when using the finishing solution to remove unwanted material. Additionally, with such a flashpoint, the finishing solution may be configured to be used in a spraying application as described herein.

In certain examples, the finishing solution has an improved longevity in comparison to certain commercial finishing solutions such as IPA, wherein a greater amount of resin or unwanted material may be removed with a fixed volume of the finishing solution described herein (in comparison to a similar fixed volume of the commercial finishing solution such as IPA) before the finishing solution is saturated and needs to be recycled for further use. For example, the finishing solutions described herein may dissolve at least 2 times, 3 times, 4 times, 5 times, 6 times, 7 times, 8 times, 9 times, or at least 10 times as much resin or unwanted material in comparison to a commercial finishing solution such as IPA, e.g., under similar operating conditions such as time, temperature, and/or agitation.

In certain examples, the finishing solution provides a faster removal time of an unwanted material or resin in comparison to IPA, such that a larger amount of resin or unwanted material may be removed (e.g., as measured in volume % or weight %) by the finishing solution described herein within a fixed amount of time when compared with a commercial finishing solution for a same amount of time. Alternatively, the faster removal time may be described as removing a fixed amount (vol % or wt %) of unwanted material in a shorter amount of time.

In certain examples, the finishing solution has an improved odor (or lack thereof) in comparison to commercial solutions such as IPA.

In certain examples, the finishing solution is non-cytotoxic.

In certain examples, the finishing solution has a lower cost to use when compared with commercial solutions such as IPA.

Methods of Use

In certain methods of use of the finishing solutions disclosed herein, an unfinished object (e.g., 3D-printed object) may be subjected to a process to remove unwanted material, and thereby provide a finished part.

In one such method, the object is placed in a tank that has been filled (e.g., filled at least partially) with a liquid finishing solution. The object may be submerged in the finishing solution.

While the object is in the finishing solution (e.g., submerged in the finishing solution), the object may be subjected to application of mechanical energy, such as agitation, abrasion, and/or heating in order to remove unwanted resin from the object. Mechanical energy agitation may occur by moving the liquid finishing solution (e.g., via a pump) and/or by using ultrasound. In other such processes, the object is subjected to a liquid spray. In these processes, the object is placed in a chamber, and a pump is used to force the liquid finishing solution through one or more nozzles (e.g., spraying), which apply the finishing solution to the object and mechanically agitates the object. In submersion and spraying processes, the liquid may include chemical solvents to dissolve unwanted material, and thereby create a finished or nearly finished form of the object. Heat from a heat source may be used to maintain the finishing solution at a desired temperature. Under these conditions, the unwanted material may be removed thermally, chemically, mechanically or via a combination of two or more of these methods.

FIG. 1 depicts a flow diagram of an exemplary method of using a finishing solution. The steps of such a method may be sufficient to remove unwanted material from a 3D-printed object, build plate, or build tray. The method as depicted in FIG. 1 may include, in act 1, applying (e.g., by submerging the object) a finishing solution to an object or a portion thereof. Application of the finishing solution may be accomplished by submerging in the finishing solution all or part of the object that requires finishing. When used herein, the word "submerged" refers to a situation where the object is submerged at a depth sufficient to cover the object or portion thereof that requires finishing. The finishing solution may be stored in a holding vessel/container/tank. Non-limiting examples of materials that the holding vessel/container/tank may be made of include stainless steel, glass, high density polyethylene, Teflon, Kalrez, Polyvinylidene Fluoride (PVDF), and the like.

In FIG. 1, in act 2, the finishing solution may be soaked and/or agitated during at least part of the application. Agitation and/or vibration may be induced by methods such as, but are not limited to, sonication (e.g., via an ultrasonic transducer sending ultrasonic longitudinal waves into the finishing solution), a pump (e.g., using a pump to effect fluid movement), stirring, or a combination thereof.

Sonication may be performed at a power up to and including 1750 W, including all 0.1 W values and ranges below 1750 W, where power may vary temporally, and at a frequency of 20-100 kHz, including all 0.1 kHz values and ranges therebetween. In a preferred example, the frequency is 40 kHz. Sonicating a finishing solution may agitate the finishing solution such that the finishing solution does not separate into distinct phases and/or such that a force is applied to the object, or to move the finishing solution. Applying a force to the object helps dislodge and/or dissolve unwanted material. Such a finishing solution may be agitated for 0-60 minutes, including all 1 second values and ranges therebetween (e.g., 1-60 minutes, 10-30 minutes, 1-15 minutes, 15-30 minutes, 30-60 minutes, etc.), prior to the object being submerged, and/or while the object is submerged.

The ultrasonic waves may be provided at a selected first agitation frequency. When agitated by the first frequency, the amplitude of the reflected ultrasonic waves may be detected by a sensor, and the amplitude of the reflected waves may be measured. Based on the measured amplitude, a second ultrasonic frequency may be selected, for example, using a database. Then ultrasound waves having the selected second ultrasonic frequency may be directed at the object. In this manner, the second ultrasonic frequency may be selected so as to optimally agitate.

This process may be repeated until the detected amplitude indicates (e.g., indicates through sensor feedback) that a resonant frequency of unwanted material has been reached. As unwanted material is removed, the resonant frequency of the remaining material may change, and so the process of selecting an ultrasonic agitation frequency may need to be repeated from time to time. When the desired run time has been reached, the object may be removed from the tank and inspected to determine whether additional run-time is needed. Additional run-time may be needed if the object is "tacky" or too rough.

Figure 2A:
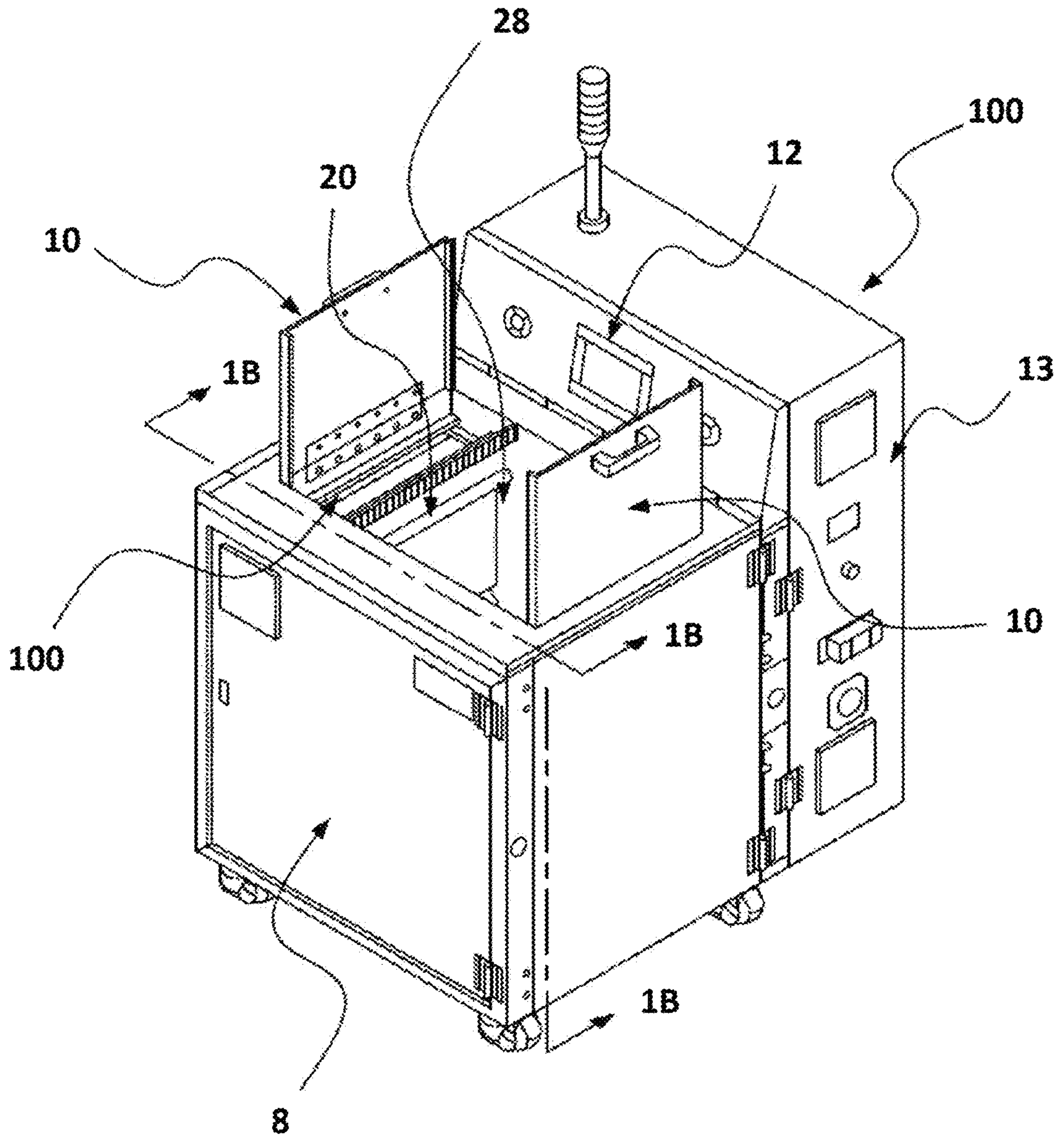
FIG. 2A depicts an example of a machine configured to be used to finish a 3D-printed object with a finishing solution.
Figure 2B:
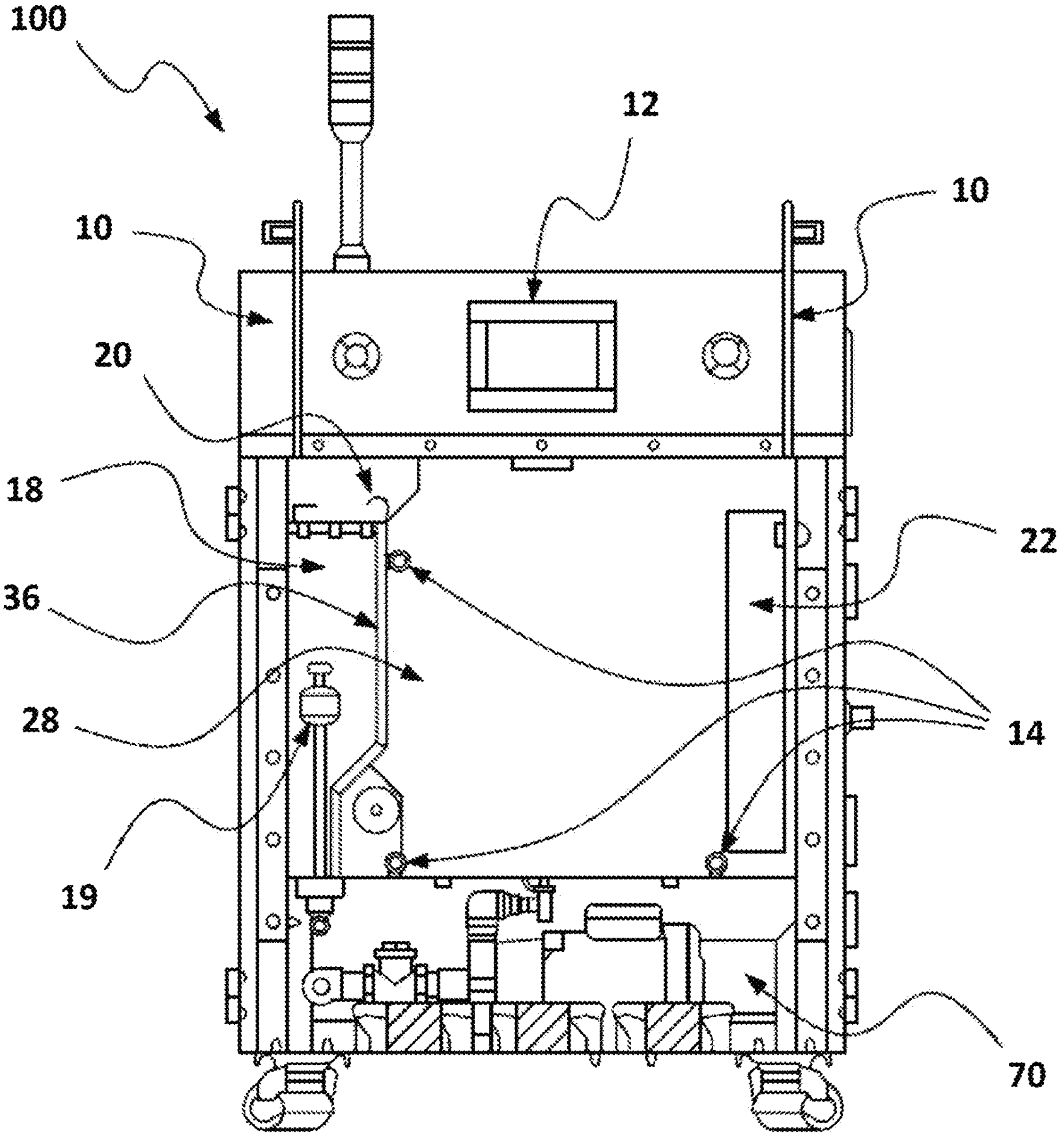
FIG. 2B is a cross-sectional view of the machine depicted in FIG. 1A.

Referring to FIGS. 2A and 2B, agitation by a pump may include pumping a finishing solution into a tank (28) containing the object. For example, a finishing solution may be pumped into a tank (28) at a rate of 1-20 gallon/minute, including all 0.1 gallon/minute values and ranges therebetween. By pumping finishing solution into the tank (28), an equal amount of finishing solution may be made to flow out of the tank (28), over a weir (20) into an input tank (18), and then through a filter to a drain and back to the inlet of the pump. As the finishing solution is pumped into the tank (28), the solution entering the tank mixes with the finishing solution that was already in the tank. A finishing solution may be agitated for 0-60 minutes, including all 1 second values and ranges therebetween (e.g., 1-60 minutes, 10-30 minutes, 1-15 minutes, 15-30 minutes, 30-60 minutes, etc.), prior to the object being submerged and/or while the object is submerged. Agitation prior to the object being submerged aids in mixing the finishing solution. Agitation after the object is submerged assists in removing unwanted material. Additionally, any other method to induce fluid movement may be suitable to induce such agitation (e.g., such as that induced by an ultrasonic generator (70)).

Stirring of the finishing solution may be performed by the use of an impeller, mechanical stirrer, stir bar, or the like. A finishing solution may be agitated for 0-60 minutes, including all 1 second values and ranges therebetween (e.g., 1-60 minutes, 10-30 minutes, 1-15 minutes, 15-30 minutes, 30-60 minutes, etc.), prior to the object being submerged and/or while the object is submerged.

An object may be submerged in a finishing solution and agitated during at least part of the submersion. An object may be submerged for a time sufficient to remove unwanted resin. During such submersion, the finishing solution may be agitated during the entire time of submersion or during part of the time that the object is submerged. The amount of time may be 0-60 minutes, including all 1 second values and ranges therebetween (e.g., 1-60 minutes, 10-30 minutes, 1-15 minutes, 15-30 minutes, 30-60 minutes, etc.). The amount of time needed to remove the unwanted material from the object may depend on the geometry of the object. For example, more complicated geometries may require additional submersion time. Often, an object may be adequately finished by submerging the object for a time that is between 1 and 30 minutes, including all 1 second values and ranges therebetween, and the finishing solution may be agitated for the entire duration of submersion or during part of the time that the object is submerged.

Agitation of the finishing solution induced by stirring, a pump, and/or other methods, may create friction between the finishing solution and the object being finished, thereby assisting in removal of unwanted material. Removal of the unwanted material may be enhanced by ultrasonic transducers placed in the tank, such that the finishing solution vibrates, which is then imparted to the object. In an example, the ultrasonic transducers may be arranged on the side of the tank, and oriented tangential to the rotational flow of finishing solution in the tank. Such placement of the ultrasonic transducers achieves efficient agitation of the finishing solution and, thus, the submerged object. Sonication caused by ultrasonic transducers may enhance removal of unwanted material by causing cavitation at the surface of the unwanted material and the mechanical agitation caused by cavitation removes the unwanted material. Such cavitation may be useful because cavitation enhances removal of unwanted material.

The finishing solution may be heated to or maintained at a temperature to increase the rate of solubilization of unwanted resin. For example, the finishing solution may be kept at temperatures up to 55° C. (131° F.) (including all 0.1° C. or 0.1° F. values and ranges between 20° C. (68° F.) and 55° C. (131° F.)), before the object is submerged and/or while the object is submerged. At higher temperatures, e.g., higher than 55° C. (131° F.), appropriate handling precautions may be taken.

A finishing solution may be recovered after the finishing operations are concluded. Steps for recovering the finishing solution may include allowing finishing solution to drip from the object back into a tank containing the finishing solution. The object may be rinsed with water or other suitable solvent. Such rinsing may be necessary to remove finishing solution that remains on the object. Following application of the finishing solution, the object may be rough and tacky. Tackiness is related to uncured resin remaining on the surface. Such determination for roughness and/or tackiness may be determined by personal/operator preference. Such a determination may be made by personal/operator touch. When an operator determines that the object is too rough or too tacky, then a method such as that described herein may be repeated until the desired roughness and/or tackiness is/are achieved. When the object has the desired (or lack thereof) tackiness and roughness, the operator may determine that the object no longer requires additional finishing.

Referring again to FIG. 1, in act 3, the object may be removed from the finishing solution to provide a (e.g., partially-cured and) cleaned object. Additionally, in optional act 4, the cleaned object may be rinsed or dried.

In certain alternative methods, the object (or a portion of the object) may be sprayed with a finishing solution and the finishing solution may then be removed from the object.

FIG. 2A depicts an example of a machine configured to be used for certain methods described herein with the finishing solutions described herein to finish a 3D-printed object. FIG. 2B is a cross-sectional view of the machine depicted in FIG. 2A.

FIGS. 2A and 2B depict a part finishing machine 100, a control panel 12, cover doors 10, a front panel 8, a tank 28 configured to hold a finishing solution (as described herein), a weir 20, a computer 13, an input tank 18, a liquid level sensor 19, a wall 36, an ultrasonic generator 70, a tank manifold 14, and ultrasonic transducers 22.

The part finishing machine 100 may be used in a method to finish a 3D-printed object by: (a) adding a finishing solution into a tank (28) of a machine (e.g., a machine (100) used for finishing a 3D printed object; (b) using a heater that is arranged in the tank (28) to heat the finishing solution to a desired temperature; (c) using a pump to move the finishing solution within the tank; (d) using an ultrasonic transducer (22) arranged relative to the tank to provide ultrasonic longitudinal waves and/or cavitation within the tank that agitate the finishing solution; and (e) contacting an object with the finishing solution for a desired time to remove unwanted material from the object.

Submersion in the finishing solution may weaken the unwanted material substantially by facilitating dissolution of the unwanted resin. Fluid flow and ultrasonic agitation provide some mechanical force to loosen weakened unwanted material, while also facilitating dissolution of unwanted material (e.g., uncured material and/or resin).

In certain examples, the method of using a finishing solution may be accomplished by using a machine manufactured by PostProcess Technologies, Inc. Examples of suitable machines include the DEMI (FIG. 1 shows a simplified schematic of a DEMI), CENTI, and FORTI. Embodiments of machines that can use the finishing solution to remove unwanted material from additively manufactured objects are disclosed in U.S. Patent Application Publication No. 2017/0348910, filed Jun. 1, 2016, the entire disclosure of which is incorporated by reference herein.

Additional agitation, such as from a pump, may reduce the amount of time needed to remove unwanted material. Using such a machine may involve: (a) adding a finishing solution into a machine (100) from the top of the machine by lifting a lid (or other suitable mechanism to cover the tank (28), such as the cover doors (10) depicted in FIG. 2A and FIG. 2B) and pouring the finishing solution directly into a tank (28); (b) mixing the finishing solution (e.g., mixing may be performed by a pump and/or ultrasonic agitation) sufficiently so that the finishing solution does not separate; (c) heating the finishing solution via a submerged heater arranged in the tank, in order to heat the finishing solution to a desired temperature; (d) pumping the finishing solution using a pump that may be arranged below the tank, in order to move the finishing solution through the tank and thereby agitate the solution and/or object.

The machine may be filled with finishing solution using an automated filling feature having a pump and reservoir. A liquid level sensor (19) may be positioned in the tank (28) or input tank (18). When signals from that sensor indicate the liquid level is too low, a pump may be caused to move fluid from the reservoir to the tank (28). The solution may be premixed before being added to the reservoir. In addition, the finishing solution may need to be mixed after the finishing solution has been added to the tank (28) in order to prevent separation of the components.

A method of removing unwanted material may include placing a 3D-printed object within a tank of a machine, such as, for example, the machine depicted in FIG. 2A. A desired run time may be determined and/or selected, and the pump started so that the finishing solution is circulated through the tank by the pump. The method may involve: (a) placing an object in the finishing solution; (b) circulating the finishing solution through the tank (28) to cause the object to rotate within the finishing solution; and (c) directing ultrasonic energy waves at the object in the finishing solution so as to provide agitation and/or cavitation.

In another example, the finishing solution may be applied to the object by spraying the finishing solution on the object. Spraying may be accomplished by using a machine capable of spraying the object or using a spray bottle (e.g., a bottle having an atomizer nozzle). Embodiments of machines that can use the finishing solution to remove unwanted material from additively manufactured objects are disclosed in U.S. Patent Application Publication No. 2019/0202126, filed Dec. 17, 2017, the entire disclosure of which is incorporated by reference herein.

In another example, finishing of the object may be performed on a bench top using a mixer (e.g., a stir plate and magnetic stir bar, or a mechanical stirrer) and a tank (e.g., a flask or beaker) to hold the finishing solution (and object being finished). The object may be placed in the tank holding the finishing solution. While the object is in that finishing solution, the mixer applies a force to the finishing solution, such that the finishing solution is moved within the tank, and also applies a force to the object, whereby unwanted material is loosened from the object.

Figure 3A:
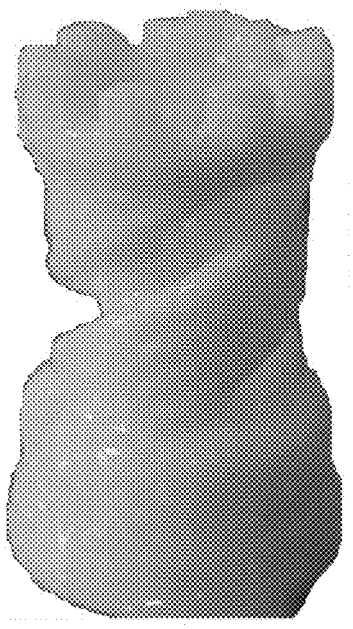
FIGS. 3A and 3B are photos of an object (a rook) that was made by stereolithography (SLA) having a resin.
Figure 3B:

FIGS. 3A and 3B depict an example of how a finishing solution may remove unwanted material from a 3D printed object to provide a partially-cured and cleaned object. Specifically, the figures depict photos of an object (a rook) that was made by stereolithography (SLA) with a resin. FIG. 3A shows the object prior to application of a finishing solution. FIG. 3B shows the object after submersion in a finishing solution, wherein unwanted material (e.g., uncured resin) has been removed to provide the partially-cured and cleaned 3D printed object.

EXAMPLES

Examples of various finishing solutions are disclosed herein. Additionally, three comparative examples representing various current commercial finishing solutions are also disclosed herein for reference and comparison.

Example 1

| Chemical | Actual Percent | Percent Range | CAS # | Chemical Type |
|---|---|---|---|---|
| Butyl Carbitol (2-(2-Butoxyethoxy)Ethanol) | 45% | 20-60% | 112-34-5 | Glycol Ether |
| Neodene-14 (1-Tetradecene) | 30% | 20-60% | 1120-36-1 | Hydrocarbon |
| Tripropylene Glycol Methyl Ether | 20% | 20-60% | 25498-49-1 | Glycol Ether |
| Dimethyl Adipate | 5% | 1-20% | 627-93-0 | Methyl Ester |

Example 2

| Chemical | Actual Percent | Percent Range | CAS # | Chemical Type |
|---|---|---|---|---|
| Butyl Carbitol (2-(2-Butoxyethoxy)Ethanol) | 45% | 20-60% | 112-34-5 | Glycol Ether |
| Neodene-14 (1-Tetradecene) | 30% | 20-60% | 1120-36-1 | Hydrocarbon |
| Triethylene Glycol Monomethyl Ether | 20% | 20-60% | 112-35-6 | Glycol Ether |
| Dimethyl Adipate | 5% | 1-20% | 627-93-0 | Methyl Ester |

Example 3

| Chemical | Actual Percent | Percent Range | CAS # | Chemical Type |
|---|---|---|---|---|
| Methyl Carbitol (2-(2-Methoxyethoxy)Ethanol) | 40% | 20-60% | 112-34-5 | Glycol Ether |
| Triethylene Glycol Monomethyl Ether | 40% | 20-60% | 112-35-6 | Glycol Ether |

-continued

| Chemical | Actual Percent | Percent Range | CAS # | Chemical Type |
|---|---|---|---|---|
| Triethylene Glycol Dimethyl Ether (aka 1,2-Bis(2-methoxyethoxy)Ethane) | 20% | 20-60% | 112-49-2 | Glycol Ether |

Example 4

| Chemical | Actual Percent | Percent Range | CAS # | Chemical Type |
|---|---|---|---|---|
| Methyl Carbitol (2-(2-Methoxyethoxy)Ethanol) | 40% | 20-60% | 112-34-5 | Glycol Ether |
| Triethylene Glycol Monomethyl Ether | 40% | 20-60% | 112-35-6 | Glycol Ether |
| Tetraethylene Glycol Dimethyl Ether (aka Tetraglyme) | 20% | 20-60% | 143-24-8 | Glycol Ether |

Example 5

| Chemical | Actual Percent | Percent Range | CAS # | Chemical Type |
|---|---|---|---|---|
| Butyl Carbitol (2-(2-Butoxyethoxy)Ethanol) | 40% | 20-60% | 112-34-5 | Glycol Ether |
| Neodene-14 (1-Tetradecene) | 40% | 20-60% | 1120-36-1 | Hydrocarbon |
| Benzyl Alcohol | 20% | 20-60% | 100-51-6 | Alcohol |

Example 6

| Chemical | Actual Percent | Percent Range | CAS # | Chemical Type |
|---|---|---|---|---|
| Butyl Carbitol (2-(2-Butoxyethoxy)Ethanol) | 40% | 20-60% | 112-34-5 | Glycol Ether |
| Neodene-14 (1-Tetradecene) | 40% | 20-60% | 1120-36-1 | Hydrocarbon |
| 2-Phenoxyethanol | 20% | 20-60% | 122-99-6 | Alcohol |

Example 7

| Chemical | Actual Percent | Percent Range | CAS # | Chemical Type |
|---|---|---|---|---|
| Ethyl Carbitol (2-(2-Ethoxyethoxy)Ethanol) | 40% | 20-60% | 111-90-0 | Glycol Ether |
| Tripropylene Glycol Methyl Ether | 20% | 20-60% | 25498-49-1 | Glycol Ether |
| Triethylene Glycol Dimethyl Ether (aka 1,2-Bis(2-methoxyethoxy)Ethane) | 20% | 20-60% | 112-49-2 | Glycol Ether |
| Dimethyl Adipate | 5% | 1-20% | 627-93-0 | Methyl Ester |

Comparative Example 1

| Chemical | Actual Percent | Percent Range | CAS # | Chemical Type |
|---|---|---|---|---|
| Tripropylene Glycol Methyl Ether | Unknown | 20%-80% | 25498-49-1 | Glycol Ether |
| Dipropyl Glycol Monomethyl Ether | Unknown | 20%-80% | 34590-94-8 | Glycol Ether |

Comparative Example 2

| Chemical | Actual Percent | Percent Range | CAS # | Chemical Type |
|---|---|---|---|---|
| Tripropylene Glycol Methyl Ether | 100% | 100% | 25498-49-1 | Glycol Ether |

Comparative Example 3

| Chemical | Actual Percent | Percent Range | CAS # | Chemical Type |
|---|---|---|---|---|
| Isopropyl Alcohol | 100% | 100% | 67-63-0 | Alcohol |

Figure 4:
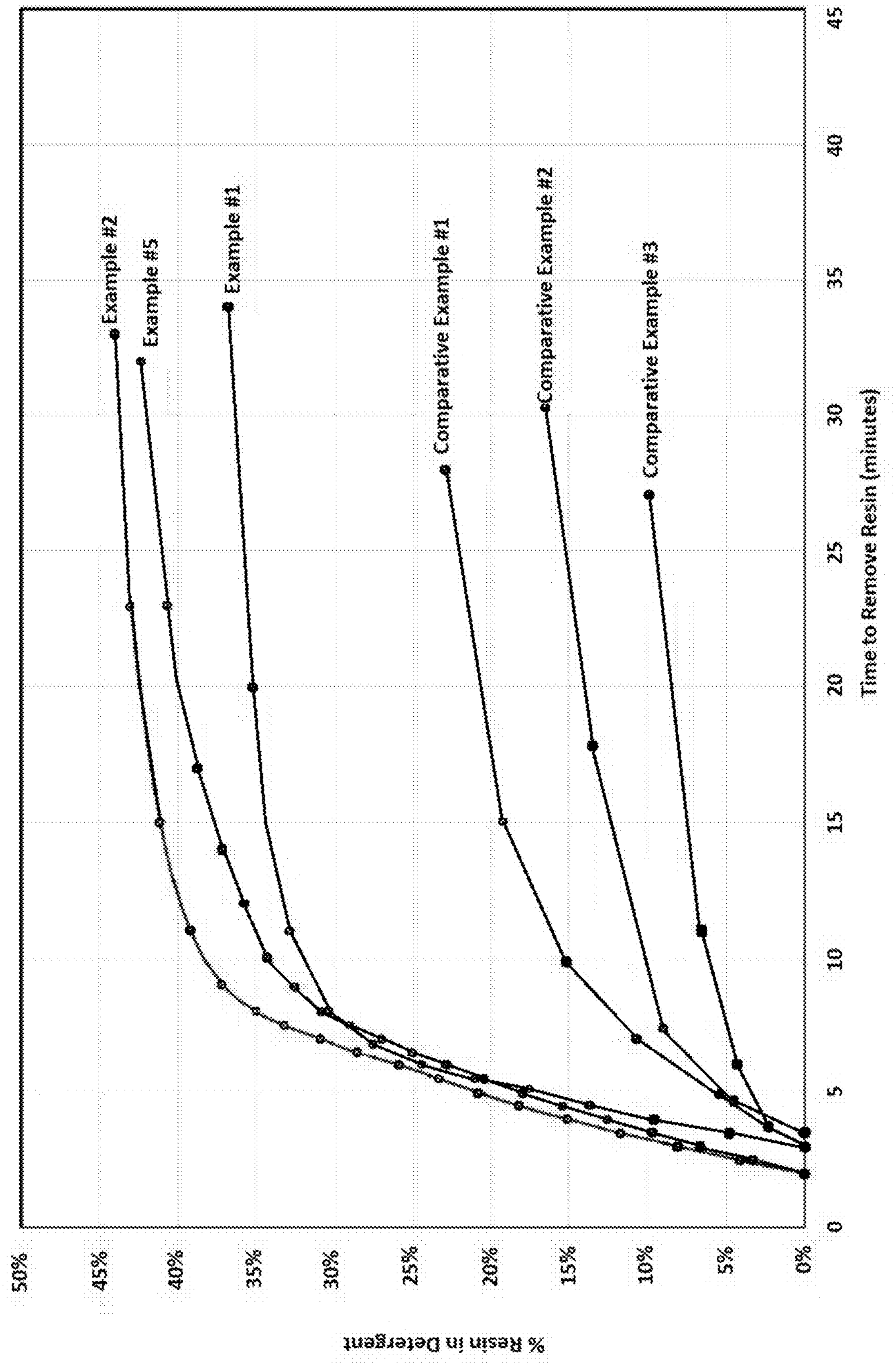
FIG. 4 depicts a chart showing an amount of unwanted material (unwanted resin) removed into the solution (as a weight % of resin in the solution) over a period of time of the uncured object in solution. The chart compares various current examples (i.e., Examples 1, 2, and 5) from the present disclosure versus three comparative commercial examples.

FIG. 4 depicts a chart comparing finishing solutions disclosed within the present application (i.e., Examples 1, 2, and 5) versus comparative examples of commercial embodiments (i.e., comparative examples 1, 2, and 3). Specifically, FIG. 4 depicts a chart showing the amount of resin removed into the solution (as a weight % of resin in the solution) over a period of time of the uncured object in solution.

As shown in FIG. 4, the current embodiments within Example 1, 2, and 5 are all able to remove more unwanted resin from the surface of a 3D printed object in a same or shorter amount of time (i.e., >30% resin in solution in 10 minutes) than the comparative commercial examples. As depicted in FIG. 4, the embodiments within Examples 1, 2, and 5 were able to remove an amount of unwanted resin such that the finishing solution/detergent had approximately between 30%-40% in solution after 10 minutes of submersion and agitation within the solution. In comparison, the comparative examples only removed less material in the same amount of time such that only between 5%-15% of resin was in the finishing solution. As such, after 10 minutes of submersion and agitation in similar operating conditions, the current embodiments disclosed herein were capable of dissolving at least 2 times, 3 times, 4 times, or at least 5 times as much resin or unwanted material in comparison to a commercial finishing solutions in comparative examples 1-3.

Additionally, the current embodiments within Examples 1, 2, and 5 are all able to remove more resin prior to saturation of the solution in comparison to the comparative commercial examples.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

As used herein, the singular forms "a," "an," and "the" include plural referents unless the context clearly dictates otherwise.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the disclosure. The claims should not be read as limited to the described order or elements unless stated to that effect. Therefore, all embodiments that come within the scope and spirit of the following claims and equivalents thereto are claimed as the disclosure.

The invention claimed is:

1. A finishing solution comprising:

20-60% by weight of a first glycol ether;

20-60% by weight of a high flash point hydrocarbon having a flash point of at least 93.3° C.; and 1-20% by weight of a high flash point ester having a flash point of at least 93.3° C. or 20-60% by weight of a high flash point alcohol having a flash point of at least 93.3° C., wherein the overall finishing solution has a flash point of at least 93.3° C., and wherein the finishing solution is configured to remove uncured material or unwanted resin from a surface of an additive manufactured object.

2. The finishing solution of claim 1, wherein the finishing solution has 1-20% by weight of the high flash point ester.

3. The finishing solution of claim 2, wherein the high flash point ester is dimethyl adipate.

4. The finishing solution of claim 1, wherein the finishing solution has:

20-60% by weight of the first glycol ether;

20-60% by weight of the high flash point hydrocarbon; and 20-60% by weight of the high flash point alcohol.

5. The finishing solution of claim 4, wherein the high flash point alcohol is benzyl alcohol.

6. The finishing solution of claim 1, wherein the first glycol ether is Butyl Carbitol (2-(2-Butoxyethoxy) Ethanol), Methyl Carbitol (2-(2-Methoxyethoxy) Ethanol), or Ethyl Carbitol (2-(2-Ethoxyethoxy) Ethanol).

7. The finishing solution of claim 1, wherein the high flash point hydrocarbon is neodene-14 (1-tetradecene).

8. The finishing solution of claim 1, wherein the finishing solution is configured to remove at least two times as much unwanted material from the surface of the additive manufactured object after 10 minutes of submersion of the additive manufactured object in the finishing solution, as compared with an amount of unwanted material removed from the surface of the additive manufactured object after submersion of the additive manufactured object in isopropyl alcohol for 10 minutes.

9. The finishing solution of claim 2, further comprising:

20-60% by weight of a second glycol ether.

10. A finishing solution configured to remove unwanted material from a surface of an object, the finishing solution comprising:

20-60% by weight of a first glycol ether;

20-60% by weight of a second glycol ether;

20-60% by weight of a high flash point hydrocarbon having a flash point of at least 93.3° C.; and 1-20% by weight of a high flash point ester having a flash point of at least 93.3° C., wherein the finishing solution has a flash point of at least 93.3° C., and wherein the second glycol ether is Tripropylene Glycol Methyl Ether or Triethylene Glycol Monomethyl Ether.

11. The finishing solution of claim 1, wherein the finishing solution consists essentially of the first glycol ether, the high flash point hydrocarbon, and the high flash point ester or the high flash point alcohol.

12. The finishing solution of claim 1, wherein the finishing solution is non-cytotoxic.

13. The finishing solution of claim 1, wherein the flash point of the overall finishing solution is in a range of 98.9° C.-200° C.

14. The finishing solution of claim 1, wherein the flash point of the overall finishing solution is in a range of 104.4° C.-200° C.

15. A finishing solution comprising:

20-60% by weight of a first glycol ether;

20-60% by weight of a high flash point hydrocarbon having a flash point of at least 93.3° C.; and 1-20% by weight of a high flash point ester having a flash point of at least 93.3° C. or 20-60% by weight of a high flash point alcohol having a flash point of at least 93.3° C., wherein the overall finishing solution has a flash point in a range of 98.9° C.-200° C.

* * * * *